United States Patent
Boileau

[15] 3,692,080
[45] Sept. 19, 1972

[54] REINFORCED TIRE
[72] Inventor: Jacques Boileau, Clermont-Ferrand, France
[73] Assignee: Compagnie Generale Des Elablissements Michelin, raison sociale Michelin &. Cie., Clermont-Ferrand (Puy-de-Dome), France
[22] Filed: June 3, 1970
[21] Appl. No.: 43,121

[30] Foreign Application Priority Data
June 11, 1969 France......................6919439

[52] U.S. Cl.................................152/359, 152/361
[51] Int. Cl. .......................B60c 9/04, B60c 9/20
[58] Field of Search..........152/357, 359, 361, 362 R, CS 362

[56] References Cited
UNITED STATES PATENTS

| 2,217,826 | 10/1940 | Van Laer | 96/26 |
| 2,317,911 | 4/1943 | Hoff | 152/359 |
| 2,056,012 | 9/1936 | Madge et al. | 152/355 |
| 3,040,797 | 6/1962 | Saint Paul | 152/362 R |
| 2,947,340 | 8/1960 | French | 152/362 R |
| 3,390,714 | 7/1968 | Marzocchi et al. | 152/361 |

Primary Examiner—Gerald M. Forlenza
Assistant Examiner—Robert Saifer
Attorney—Brumbaugh, Graves, Donohue & Raymond

[57] ABSTRACT

A tire reinforcement in the tread, carcass, or both is made of fiber glass, carbon whiskers, or a similar material closely associated with monofilaments. Each monofilament has a diameter greater than 0.5 mm and is made of an incompressible and extensible material that can be spun.

7 Claims, 4 Drawing Figures

PATENTED SEP 19 1972

3,692,080

INVENTOR.
JACQUES BOILEAU
BY
his ATTORNEYS

REINFORCED TIRE

BACKGROUND OF THE INVENTION

This invention relates to tires and, more particularly, to novel and highly-effective reinforced tires with glass fibers or similar materials.

The use of glass fiber in the reinforcement of tires and specifically in the peak reinforcement of radial-carcass tires or crossed-carcass tires has already been suggested. However, glass fibers are not only expensive but also have defects which limit or prohibit their use in tires of a quality capable of serving over long periods under sometimes severe conditions. For example, glass fibers are poor heat conductors and have also little resistance to crushing. The latter defect is the cause of ruptures due to fatigue when glass fibers are employed in tires, in which they are subject by necessity to alternating stresses of compression and tension. Moreover, it is well known that glass fibers have little resistance to buckling and cannot assume a very small radius of curvature without breaking.

In order to improve the resistance of glass fibers to compression and fatigue, it has been suggested that there be employed a high degree of twisting in the assembling of the individual fibers constituting a cord. It is true that twisting provides better resistance to compression, but this gain is pad for by a reduction of the breaking load or by a loss in what above all constitutes the importance of glass fibers, namely their tensile strength.

It has also been suggested that improved resistance of glass fibers to compression could be obtained by calendering them in hard rubber for the purpose of having the rubber reduce the buckling of the glass fibers. However, this means does not furnish the desired improvement.

SUMMARY OF THE INVENTION

An object of the present invention is to remedy the known disadvantages of glass fibers and similar materials and to make it possible to take advantage of the high tensile strength of the fibers and the high ratio of breaking load to weight, by more effective utilization of glass fibers and similar materials in the reinforcement of rubber articles and especially of tires.

The foregoing and other objects are attained in accordance with the invention by the provision of a tire comprising in its reinforcement glass fibers or similar fibers characterized in that the fibers are associated with monofilaments of some incompressible and extensible material that can be spun and that have a diameter exceeding 0.5 mm.

In a preferred embodiment, the glass fibers in form of cords or rovings are calendered in soft rubber and the monofilaments in hard rubber.

Monofilaments that can be used include rayon, polyamides polyesters, polyvinyl alcohols, polycarbonates, polyimides and polyethers. Essentially, they should have a comparatively large diameter in relation to their lengths when used in the tire. In practice, a diameter ranging from 0.7 mm to 1.0 mm gives them a resistance to buckling which is much higher than that of textile cords.

The monofilaments as well as the glass fibers or rovings may be used either in the peak reinforcement or in the carcass reinforcement, the essential feature being the association of the monofilaments with the glass fibers in all parts of the tire in which glass fibers are used. The monofilaments contribute in the regions of the tire that are reinforced by glass fibers a resistance to crushing that the latter are incapable of contributing. Several modes of association of glass fibers and monofilaments are possible.

In one embodiment, one may use mixed plies of monofilaments and glass fiber cords or rovings. A mixed ply comprises successively a calendered layer of hard rubber in which the monofilaments are placed parallel to one another, an intermediate layer of comparatively soft rubber, followed by a layer of glass fiber cords or rovings placed parallel to the monofilaments and in the spaces between successive monofilaments, and, finally, a calendered layer of soft rubber embedding the fiber glass elements. In accordance with the invention it is also possible to make the intermediate layer or the last-named calendered layer of hard rubber but both of them at the same time since the glass fiber elements held between those layers have a tendency on vulcanization to adjust their positions in the soft rubber. Thus, the soft rubber forms the larger part of the environment of the glass fiber elements. Preferably, these mixed plies are used either in a peak reinforcement or in a carcass reinforcement in such a manner that the soft rubber layers of two mixed plies are joined to each other. The directions of the wires, strings, cords or rovings may be different in two consecutive mixed plies and may form, for example symmetrical angles in relation to the median plane of symmetry of the tire.

In another embodiment, one can associate one ply formed of monofilaments, preferably contiguous monofilaments, with one or more glass fiber cord plies, by preference enveloping the monofilament ply. In this embodiment, one obtains a practically uncrushable ply of monofilaments inasmuch as the glass fiber plies surrounding it render any relative displacement of the monofilaments practically impossible.

In addition to these forms of association of monofilaments and glass fibers, one may use, in accordance with the invention, simpler forms wherein, for example, each ply of glass fibers is covered or lined by a monofilament ply arranged parallel to the glass cords, or also wherein one or more plies of glass fibers are associated in any manner whatever with one or more plies of monofilaments, it not being necessary that a ply of either kind be lined with a ply of the other kind.

In another embodiment, one may use for the fashioning of the carcass plies and/or peak plies a composite cord comprising a core constituted by a monofilament and a sheath formed of a braid or a winding of glass fibers, with or without rubber placed in between.

It is possible to combine a conventional carcass reinforcement comprising conventional wires or cords––– for example, steel, rayon, polyamide or polyester—and a peak reinforcement comprising monofilaments and glass fiber assemblies. It is also possible to combine a conventional peak reinforcement, for example, of metal, with a carcass comprising monofilaments and glass fiber assemblies.

As mentioned above, it is preferable to embed the monofilaments in a hard rubber layer and the cords or assemblies of glass fiber in a layer of soft rubber. That is because it is desirable to counteract as much as possible the movements of the monofilaments in relation to one another by means of hard rubber, so as to improve their collective resistance to compression. On the other hand, it is advisable not to counteract the relative movements of the glass fiber assemblies in order to reduce any possible effect of impacting or thrust causing buckling. As an example, as hard rubber one will choose a rubber with a modulus of elasticity at 100 percent elongation of at least 400 g/mm$^2$ and as soft rubber a rubber the elasticity modulus of which at 100 percent elongation is at maximum 400 g/mm$^2$.

In place of glass fibers, one may also use carbon fibers or fibers of a refractory material, known as "whiskers"r very high-modulus textile fibers the resistance to compression of which is low.

BRIEF DESCRIPTION OF THE DRAWING

An understanding of additional aspects of the invention may be gained from a consideration of the following detailed description of several representative embodiments thereof, taken in conjunction with the appended figures of the drawing, in which.

DESCRIPTION OF THE PREFERRED EMBODIMENTS

Figure 1:
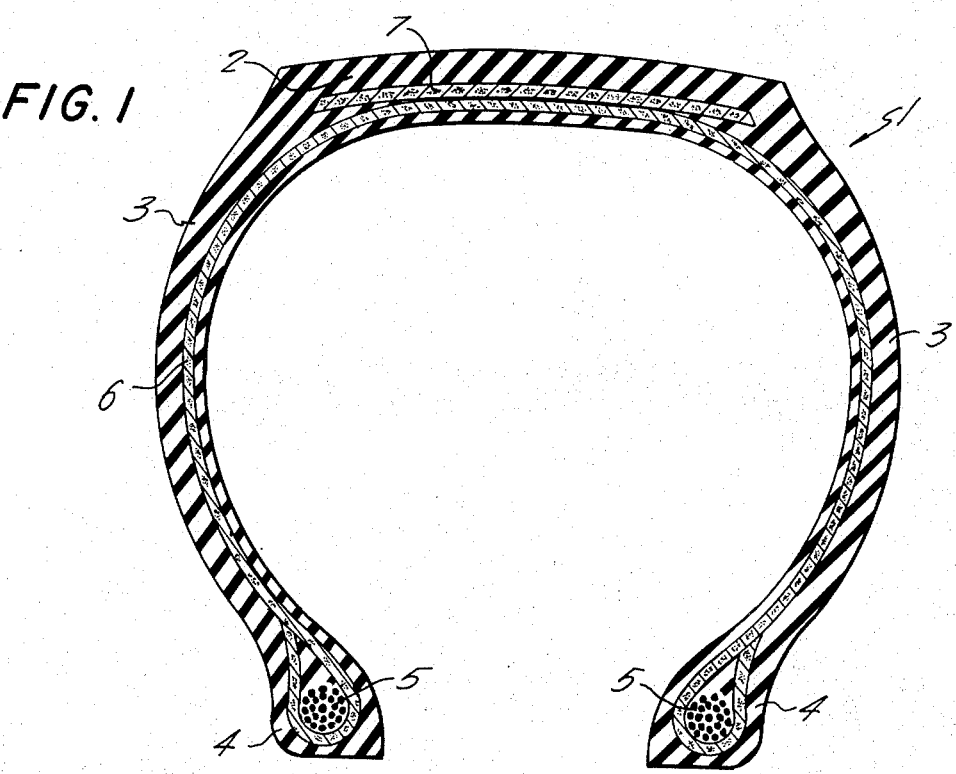
FIG. 1 is a radial section of a representative embodiment of a tire in accordance with the invention.

FIG. 1 shows a tire 1 comprising a tread 2 and sidewalls 3 ending in beads 4 containing bead wires 5. The tire has a carcass reinforcement 6 formed by a ply turned around the bead wires 5 as well as a peak reinforcement 7 formed by the superposition of several plies.

Figure 2:
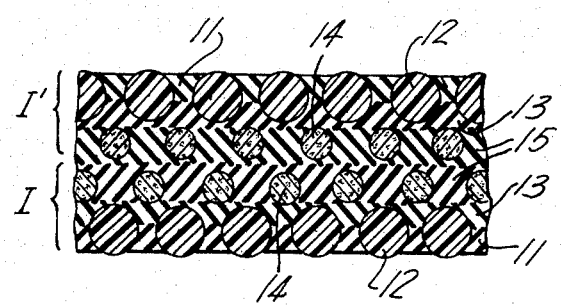
FIG. 2 is a cross section, on a larger scale, of a representative embodiment of an assembly of two mixed plies according to the invention forming the peak and/or carcass reinforcement of the tire shown in FIG. 1.

FIG. 2 shows a portion of a reinforcement formed by the superposition of two mixed plies in accordance with the invention. The reinforcement of FIG. 2 may be used with carcass 6, the peak reinforcement 7, or both. A single mixed ply I or I' may be used in the carcass if it is radial.

Each of the two plies I and I' consists of
- a first skim 11 of 0.3 mm thickness, consisting of hard rubber with a modulus of elasticity at 100 percent elongation of 420 g/mm$^2$;
- a layer of polyamide monofilaments 12 having a diameter of 0.7 mm, arranged at a center-to-center distance from one another of 1.0 mm;
- a second skim 13 of 0.3 mm thickness, of rubber having a modulus of elasticity at 100 percent elongation of 350 g/mm$^2$;
- a layer of wires 14 of 3400 decitex (decigrams per 1,000 meters), consisting of 2,040 elementary glass fibers with an approximate diameter of 9 microns each, assembled by means of slight twisting (the wires 14 are arranged parallel to the monofilaments 12 in the intervals between the monofilaments); and
- a third skim 15 of 0.6 mm thickness, of rubber with a modulus of elasticity at 100 percent elongation of 350 g/mm$^2$.

In each ply, the monofilaments 12 and the wires 14 have the same direction. The direction of the monofilaments and the wires of each individual ply crosses with that of the monofilaments and wires of the other.

A tire such as the one shown in FIG. 1 was provided with a carcass reinforcement 6 formed of a ply of rayon wires arranged radially and a peak reinforcement formed of the two plies I and I' in FIG. 2. The polyamide monofilaments and the glass fiber filaments were arranged at an angle of 22° to the right for ply I and 22° to the left for ply I' with respect to the longitudinal direction of the tire. The tire was an excellent one and greatly superior to conventional tires in which fiber glass in used. Specifically, it was found that the speed limit on a testing drum could be in excess of 200 km/hour.

The structure shown in FIG. 2 may also be used in a carcass reinforcement 6 of the crossed kind. Towards such end, it is advisable to place the polyamide monofilaments 12 and the glass fiber cords 14 at a suitable angle, ranging, for example, from 30° to 40° with respect to the radial direction. On such a carcass reinforcement 6, one may place a peak reinforcement 7 with the same structure so as to obtain a belted crossed carcass.

Figure 3:
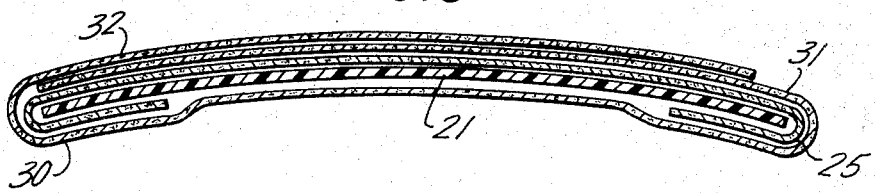
FIG. 3 is a radial section, on an intermediate scale, through a peak reinforcement in another embodiment of the invention.

In FIG. 3 is represented in radial cross section a peak reinforcement, such as the peak reinforcement 7 of FIG. 1, suitable for forming the belt of a radial-carcass tire. FIG. 3 shows a ply 21 formed of polyamide monofilaments with a diameter of 0.7 mm, placed contiguously, i.e., in a manner such that the successive monofilaments are in contact with one another. The monofilaments 21 are placed radially between two skims of 0.3 mm of rubber the modulus of elasticity at 100 percent elongation of which is 400 g/mm$^2$. The ply of monofilaments 21 is enveloped by a ply 25 of fiber glass cords which is turned back underneath the ply of monofilaments 21. The fiber glass cords are identical to the fiber glass cords 14 in FIG. 2. They are calendered in rubber with a modulus of elasticity of 210 g/mm$^2$ at 100 percent elongation. They are placed at an angle of 20° to the right and they are separated from one another by a center-to-center distance of 0.7 mm. The assembly of the plies 21 and 25 is enveloped by a ply 30 the edges of which form upper layers 31 and 32. The ply 30 is comprised of fiber glass cords that are identical to the cords of the ply 25 and are arranged in the same manner as the latter as regards their spacing, their angle and the calendering rubber. As a result of having been turned back, the layers 31 and 32 are formed of glass fiber cords which are inclined at an angle of 20° towards the left, whereas the layers 25 and 30 are formed of cords inclined at an angle of 20° towards the right.

In the peak reinforcement constituted by the plies 21, 25, 30, 31 and 32, the resistance to crushing, in transverse, longitudinal and radial directions, is provided by the contiguous arrangement of the monofilaments which form the ply 21 and their double envelopment by the plies of glass fibers.

A tire measuring 180 × 380 comprising a rayon radial carcass 6 and a peak reinforcement 7 such as shown in FIG. 3 was found to withstand more than 28,000 km of driving under difficult conditions. Moreover, it shows good road-holding ability and other road qualities which equal the qualities of radial carcass tires with textile peak reinforcements.

Figure 4:
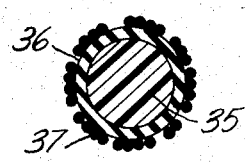
FIG. 4 is a cross section, on a scale larger than FIG. 2, of a composite cord that may be used for the carcass and/or the peak reinforcement of the tire in accordance with the invention.

In FIG. 4 is represented a cross section of a composite cord consisting of a polyamide monofilament core 35 covered by a rubber sheath 36 and a plait 37 of glass threads or fibers and embodying the same basic concept as the various embodiments of the invention described above. Such a composite element which associates a monofilament and glass fibers may serve to fashion a carcass reinforcement 6 and/or a peak reinforcement 7. Such an element may consist in a simpler manner of a polyamide monofilament core 35 covered by a glass fiber or thread plait 37. The diameter of the core 35 may be 0.7 mm and the thickness of the rubber layer 36 0.1 mm. The fiber glass plait of six times 3400 decitex may comprise 12,240 elementary fibers each of which has a diameter of 9 microns.

Thus there is provided in accordance with the invention a novel and highly effective tire including a fiber glass or similar reinforcement. Advantage is taken of the outstanding properties of fiber glass and similar materials, yet the shortcomings that have heretofore characterized such materials are avoided.

Many modifications within the spirit and scope of the invention of the representative embodiments described above will readily occur to those skilled in the art upon study of the present disclosure. Accordingly, the invention is to be construed as including all the embodiments thereof that fall within the scope of the appended claims.

I claim:

1. A tire comprising a composite reinforcement, the reinforcement comprising fibers in the form of threads made of fiberglass having high modulus, high tensile strength and low compression strength, the fibers being associated with monofilaments, each monofilament having a diameter greater than 0.5 mm and being made of an incompressible and extensible material that can be spun, and the fibers and monofilaments being disposed in adjacent and parallel superimposed relation so that the monofilaments support the fibers when they are subjected to compression.

2. A tire according to claim 1 wherein the monofilaments are made of polyamide.

3. A tire comprising a reinforcement, the reinforcement comprising fibers of high tensile strength and low compression strength, the fibers being associated with and supported by monofilaments, each monofilament having a diameter greater than 0.5 mm and being made of an incompressible and extensible material that can be spun, further comprising a layer of relatively hard rubber and a layer of relatively soft rubber, the monofilaments being embedded in the relatively hard rubber and the fibers being embedded in the relatively soft rubber.

4. A tire comprising a composite reinforcement, the reinforcement comprising fibers in the form of threads made of a first material and having a high modulus, high tensile strength and low compression strength, the fibers being associated with monofilaments closely enough to be supported by the monofilaments, each monofilament being made of a second material and having a diameter greater than 0.5 mm and being made of an incompressible and extensible material that can be spun, the reinforcement comprising successively a first layer of monofilaments, a first layer of fibers, a second layer of fibers and a second layer of monofilaments, the monofilaments of the first layer of monofilaments and the fibers of the first layer of fibers being parallel to one another, the fibers of the second layer of fibers and the monofilaments of the second layer of monofilaments being parallel to one another, and the monofilaments of the first layer of monofilaments and the fibers of the first layer of fibers on the one hand and the fibers of the second layer of fibers and the monofilaments of the second layer of monofilaments on the other being inclined with respect to each other.

5. A tire comprising a reinforcement, the reinforcement comprising fibers of high tensile strength and low compression strength, the fibers being associated with and supported by monofilaments, each monofilament having a diameter greater than 0.5 mm and being made of an incompressible and extensible material that can be spun, wherein the monofilaments are arranged contiguously and form a ply and the fibers form at least one ply, the monofilament ply being wrapped by said at least one fiber ply.

6. A tire according to claim 5 wherein the monofilaments are arranged radially and form a crown ply.

7. A tire comprising a composite reinforcement, the reinforcement comprising fibers in the form of threads made of a first material and having high modulus, high tensile strength and low compression strength, the fibers being associated with monofilaments closely enough to be supported by the monofilaments, each monofilament being made of a second material and having a diameter greater than 0.5 mm and being made of an incompressible and extensible material that can be spun, the monofilaments and fibers forming, respectively, the core and peripheral sheath of a composite cord, further comprising a rubber between the monofilaments and fibers.

* * * * *

PO-1050
(5/69)

UNITED STATES PATENT OFFICE
CERTIFICATE OF CORRECTION

Patent No. 3,692,080  Dated September 19, 1972

Inventor(s) Jacques Boileau

It is certified that error appears in the above-identified patent and that said Letters Patent are hereby corrected as shown below:

Title page, item 73, "Compagnie Generale Des Elablissements Michelin, raison sociale Michelin & Cie." should be --Compagnie Generale Des Etablissements Michelin, raison sociale Michelin & Cie--;

Column 1, line 28, "pad" should be --paid--;

Column 1, line 58, "polyamides polyesters" should be --polyamides, polyesters--;

Column 2, line 21, "but both" should be --but not both--;

Column 2, line 59, "polyester-" should be --polyester-- --;

Column 3, line 16, "'whiskers'r" should be --"whiskers", or--;

Column 4, line 18, "ply I'" should be --ply I',--;

Column 4, line 22, "in used" should be --is used--.

Signed and sealed this 17th day of April 1973.

(SEAL)
Attest:

EDWARD M. FLETCHER, JR.
Attesting Officer

ROBERT GOTTSCHALK
Commissioner of Patents